US011479114B2

(12) United States Patent
Meise et al.

(10) Patent No.: US 11,479,114 B2
(45) Date of Patent: Oct. 25, 2022

(54) TRANSMISSION, IN PARTICULAR FOR A SINGLE WHEEL DRIVE UNIT

(71) Applicant: Robert Bosch GmbH, Stuttgart (DE)

(72) Inventors: Andreas Meise, Bochum (DE); Marco Pech, Unna (DE); Bartholomaeus Glinka, Wuppertal (DE); Markus Schmeink, Dortmund (DE)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 17/264,109

(22) PCT Filed: Aug. 5, 2019

(86) PCT No.: PCT/EP2019/071034
§ 371 (c)(1),
(2) Date: Jan. 28, 2021

(87) PCT Pub. No.: WO2020/035344
PCT Pub. Date: Feb. 20, 2020

(65) Prior Publication Data
US 2021/0370765 A1    Dec. 2, 2021

(30) Foreign Application Priority Data

Aug. 13, 2018    (DE) ...................... 10 2018 213 593.2

(51) Int. Cl.
*B60K 17/04* (2006.01)
*F16H 1/46* (2006.01)
*F16H 57/00* (2012.01)
*F16H 57/04* (2010.01)
(Continued)

(52) U.S. Cl.
CPC ............. *B60K 17/046* (2013.01); *F16H 1/46* (2013.01); *F16H 57/0025* (2013.01);
(Continued)

(58) Field of Classification Search
CPC ................ B60K 17/046; B60B 35/125; F16H 2057/02056; F16H 57/031; F16H 57/021
See application file for complete search history.

(56) References Cited

U.S. PATENT DOCUMENTS 4,330,045 A * 5/1982 Myers ..................... F16D 55/22
475/900
6,582,339 B2 * 6/2003 Damm .................... F16D 65/84
180/372
(Continued)

FOREIGN PATENT DOCUMENTS

DE      103 09 666 A1    12/2004
DE      103 31 186 A1    1/2005
(Continued)

OTHER PUBLICATIONS

International Search Report corresponding to PCT Application No. PCT/EP2019/071034, dated Oct. 31, 2019 (German and English language document) (6 pages).
(Continued)

*Primary Examiner* — Erin D Bishop
(74) *Attorney, Agent, or Firm* — Maginot, Moore & Beck LLP

(57) ABSTRACT

A compact transmission, in particular for use within a single-wheel drive unit, includes a gear carrier fixed to the frame, which has a continuous central recess, and a main transmission having an internally toothed ring gear rotatably mounted on the outside of the gear carrier, externally toothed gears arranged in front of the one of the end faces of the gear carrier and meshing with the ring gear, and an input sun shaft. The compact transmission further includes a transmission pre-stage arranged within the central recess, and a pre-stage input shaft having an externally toothed pre-stage sun wheel, a pre-stage ring gear, and at least one pre-stage intermediate gear meshing with both the pre-stage sun wheel
(Continued)

and with the pre-stage ring gear. An additional carrier is fastened to the transmission carrier, via which the pre-stage intermediate gears are held captively in the central recess.

18 Claims, 2 Drawing Sheets

(51) Int. Cl.
    *F16H 57/08*     (2006.01)
    *F16D 55/38*     (2006.01)

(52) U.S. Cl.
    CPC ..... *F16H 57/0471* (2013.01); *F16H 57/0482* (2013.01); *F16H 57/082* (2013.01); *F16D 55/38* (2013.01); *F16H 2057/085* (2013.01)

(56) References Cited

U.S. PATENT DOCUMENTS

| | | | |
|---|---|---|---|
| 7,530,416 B2 * | 5/2009 | Suzuki | F16H 1/46 180/65.6 |
| 8,430,787 B2 * | 4/2013 | Morimoto | B60K 7/0015 475/323 |
| 10,766,361 B2 * | 9/2020 | Forrest | B60K 17/046 |

FOREIGN PATENT DOCUMENTS

| | | |
|---|---|---|
| DE | 10 2015 213 692 A1 | 1/2017 |
| EP | 0 812 718 A2 | 12/1997 |

OTHER PUBLICATIONS

Hydrostatic drives Hydrotrac GFT for mobile applications RE 77110 Ed. Feb. 2016, Rexroth Bosch Group (20 pages).

Möller, D., "Powersplit Transmission for Holistic Drivetrain Optimisation," ATZoffhighway, Mar. 2015, vol. 8, 6-15 (German and English language document) (10 pages).

Kohmäscher, T. et al., "Hydrostatic Two-Motor Power Shift Transmission Optimised Control of Diesel Engine," ATZoffhighway, Mar. 2015, vol. 8, 24-35 (German and English language document) (12 pages).

Dirnberger, S. et al., "Complete Electric Drive as a Drive Unit or as a Replacement for Hydraulic Units," ATZoffhighway, Mar. 2015, vol. 8, 38-47 (German and English language document) (10 pages).

* cited by examiner

TRANSMISSION, IN PARTICULAR FOR A SINGLE WHEEL DRIVE UNIT

This application is a 35 U.S.C. § 371 National Stage Application of PCT/EP2019/071034, filed on Aug. 5, 2019, which claims the benefit of priority to Serial No. DE 10 2018 213 593.2, filed on Aug. 13, 2018 in Germany, the disclosures of which are incorporated herein by reference in their entirety.

The disclosure relates to a compact transmission which is provided in particular for use within a single wheel drive unit. The compact transmission has a transmission carrier which is fixed on the frame and which has a continuous central recess and a main transmission which comprises an internally toothed ring gear which is mounted rotatably externally on the transmission carrier, externally toothed gear wheels which are arranged in front of one face side of the transmission carrier and mesh with the ring gear and an input sun shaft. The compact transmission furthermore has a transmission pre-stage which is arranged within the central recess of the transmission carrier and has a pre-stage input shaft with an externally toothed pre-stage sun wheel, a pre-stage ring gear and at least one pre-stage idler wheel which meshes both with the pre-stage sun wheel and also with the pre-stage ring gear, preferably several pre-stage idler wheels.

BACKGROUND

A drive unit comprising a hydraulic motor and a compact transmission which has a transmission carrier which is fixed on the frame and which has a continuous central recess and a transmission with an internally toothed ring gear which is mounted rotatably externally on the transmission carrier, externally toothed gear wheels which are arranged in front of one face side of the transmission carrier and mesh with the ring gear and an input sun shaft is known, for example, from data sheet RD 77110, Edition 02.2016 from Bosch Rexroth AG. The hydraulic motor is of plug-in design and is partially received in the central recess of the transmission carrier. Drive units of this type are used as single wheel drives for wheel- or chain-driven vehicles and other mobile devices. Moreover, they can be used anywhere where something is moved or rotated, for example, on winch drums.

It is also known to combine a compact transmission with an electric motor. In order to achieve a similarly high power density as in the case of use of a hydraulic motor, an electric motor must be operated with a high rotational speed greater than 5000 or greater than 10 000 revolutions per minute. In order to convert rotational speed and torque to the level of a hydraulic motor, a transmission pre-stage must be added to the transmission provided for use with a hydraulic motor, which is referred to below as the main transmission.

Such a transmission with a transmission pre-stage is known, for example, from ATZ off highway, Edition March 2015. Here, the transmission pre-stage is flange-mounted onto the transmission carrier of the main transmission with a separate housing. As a result of this, the installation space is significantly increased in the axial direction in comparison with use of a hydraulic motor. A significant additional outlay must also be made.

A compact transmission which comprises a main transmission and a transmission pre-stage and which is used together with an electric motor is likewise known from DE 103 31 186 A1. The transmission pre-stage is arranged there within the central recess of the transmission carrier, wherein the pre-stage ring gear is inserted fixedly and non-rotatably into the transmission carrier and the pre-stage idler wheels are mounted rotatably on a planetary web as planetary wheels revolving between the pre-stage ring gear and a pre-stage sun wheel. The planetary web forms the output of the transmission pre-stage and is coupled in a rotationally conjoint manner to an input sun shaft of the main transmission.

SUMMARY

The object on which the disclosure is based is to form a compact transmission, with a transmission carrier which is fixed on the frame and which has a continuous central recess with an internally toothed ring gear which is mounted rotatably externally on the transmission carrier and is part of a main transmission which further comprises gear wheels which are arranged in front of a face side of the transmission carrier, are externally toothed and mesh with the internal gear and an input sun shaft, and with a transmission pre-stage which is arranged within the central recess of the transmission carrier and has a pre-stage input shaft with an externally toothed pre-stage sun wheel, a pre-stage ring gear and at least one pre-stage idler wheel which meshes both with the pre-stage sun wheel and also with the pre-stage ring gear, preferably several pre-stage intermediate wheels, so that its handling is facilitated and the risk of contamination is reduced.

This object is achieved in the case of a generic compact transmission in that an additional carrier is fastened to the transmission carrier, which additional carrier largely covers the central recess and by which the pre-stage idler wheels are held captively in the central recess of the transmission carrier.

A seal is advantageously arranged between the additional carrier and the transmission carrier so that no lubricating oil located in the transmission can travel to the outside via the gaps between both parts. The additional carrier can be inserted at least partially into the central recess of the transmission carrier. The seal between the transmission carrier and the additional carrier is then preferably a radial seal.

It is conceivable that the additional carrier has the same external diameter externally over its entire thickness. However, a large amount of material would then have to be removed from the transmission carrier so that this could no longer satisfy the set requirements in terms of its strength. It therefore seems to be expedient if the additional carrier has a circumferential collar with which it lies axially on the transmission carrier and on which it is fastened to the transmission carrier. The collar can, for example, only have a sixth of the overall thickness of the additional carrier on the outer circumference.

The circumferential collar of the additional carrier can, as a result of its low degree of strength, be received by a depression in the transmission carrier, wherein the transmission carrier is barely weakened by the depression due to the small depth of the depression. The thickness of the collar at the additional carrier and the depth of the depression in the transmission carrier can be matched to one another so that the additional carrier and the transmission carrier are flush with one another at the face side. Moreover, screws with a countersunk head can be used for fastening the additional carrier. The external dimensions of a known transmission without a transmission pre-stage are thus not changed by the transmission pre-stage. The screws with a countersunk head can primarily have the function of ensuring that the additional carrier bears axially against the transmission carrier and does not fall out. Pins can be provided for the support of the torque and the positioning of the additional carrier between the additional carrier and the transmission carrier.

A radial shaft seal can be arranged between the additional carrier and the pre-stage input shaft. This is above all advantageous when an electric motor to be flange-mounted onto the compact transmission is not sealed off in an oil-impervious manner to the outside or the motor to be flange-mounted is indeed sealed off, but there is no joint oil resource for motor and transmission.

Like per se from DE 103 31 186 A1, the pre-stage idler wheels can be mounted rotatably on a rotatably mounted web and then mesh as planetary wheels with the pre-stage sun wheel and a ring gear fixed on the housing. The web would then be the output of the transmission pre-stage. For the coupling of the output of the transmission pre-stage to a shaft with a large diameter, it appears, however, to be more expedient if the pre-stage idler wheels are mounted on bearing journals located fixedly on the additional carrier and the pre-stage ring gear represents the output of the transmission pre-stage. The pre-stage ring gear can be formed to be bowl-shaped with a base in which a central opening is located, the edge of which is provided with an internal toothing, via which the pre-stage ring gear is coupled in a rotationally conjoint manner with the input sun shaft of the main transmission in such a manner that the pre-stage ring gear and the input sun shaft have the same rotational speed. The fact that the pre-stage idler wheels rotate about fixed axes is highly advantageous in particular in the case of high rotational speeds of the pre-stage input shaft, for example, in the case of rotational speeds of greater than 10 000 revolutions per minute. The obligatory lubrication of the bearings of the pre-stage idler wheels which is desirable at high rotational speeds is significantly simpler in the case of stationary axes of rotation than in the case of revolving axes of rotation. Moreover, no large centrifugal forces act on the bearings of the pre-stage idler wheels if the bearings only rotate about their own central axis.

The coupling of the pre-stage ring gear with the input sun shaft of the main transmission advantageously occurs via a follower sleeve which is mounted rotatably at one end via a pivot bearing on the transmission carrier and at its other end engages with an external toothing all around into the internal toothing formed at the edge of the central opening of the pre-stage ring gear. A large external diameter of the follower sleeve is particularly advantageous when one half of the disks of a disk brake are retained in a rotationally conjoint manner thereon. The external toothing of the follower sleeve can be formed so that on one hand the pre-stage ring gear and on the other hand the disks engage behind one another and into the external toothing.

The pre-stage idler wheels are advantageously retained on the additional carrier by an idler wheel plate which are arranged in front of the face side of the pre-stage idler wheels facing away from the additional carrier and fastened with the bearing journals for the pre-stage idler wheels as spacers on the additional carrier.

The bearing journals can be formed as hollow pins, wherein the idler wheel plate is fastened to the additional carrier with the aid of screws which pass through the bearing journals.

The bearing journals can be centered in depressions of the additional carrier and/or the idler wheel plate.

If the additional carrier and the idler wheel plate are not suitable in terms of surface and material properties in order to serve directly as axial run-up points for the pre-stage idler wheels, thrust washers can be added axially between the additional carrier and/or the idler wheel plate and the pre-stage idler wheels. Axial bearing can also be used in the case of higher requirements.

The idler wheel plate can extend radially over the pre-stage input shaft and then restrict an axial movement of the pre-stage input shaft in one direction.

In the case of high rotational speeds, it is advantageous if the bearings of the pre-stage idler wheels are supplied in a targeted manner with lubricating oil. This can be performed via a fluid path which runs at least partially in the additional carrier. The lubricant supply of the bearings can be performed from the inside via the bearing journals or alternatively also via nozzles which are directed from the outside onto the pre-stage idler wheels. It is furthermore possible in the case of a suitable construction to conduct spray oil swirled up by the gear wheels out of the oil sump in a targeted manner to the bearings.

As known per se, the brake disks and an actuating piston of a service brake or a parking brake can be arranged in the central recess of the transmission carrier. The transmission pre-stage is then located radially within parts of the brake.

BRIEF DESCRIPTION OF THE DRAWINGS

An exemplary embodiment of a compact transmission according to the disclosure and, for comparison, a compact transmission without a transmission pre-stage with an inserted hydraulic motor are represented in the drawings. The disclosure will now be explained in greater detail on the basis of the figures of these drawings.

In the drawings.

DETAILED DESCRIPTION

Figure 1:
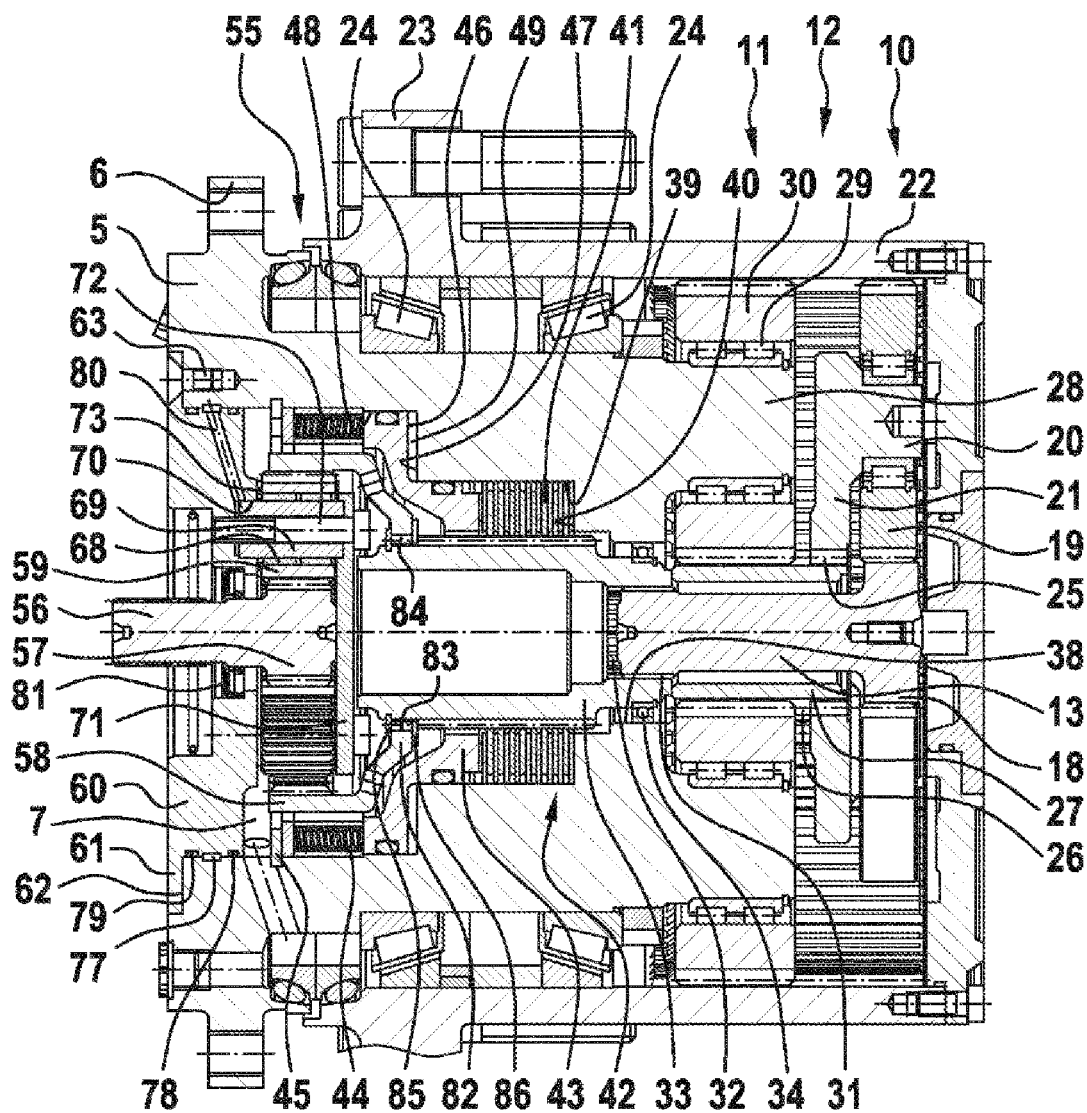
FIG. 1 shows an axial section through the exemplary embodiment of a compact transmission according to the disclosure.

The transmission according to FIG. 1 comprises a transmission carrier 5 with a fastening flange 6 with which the transmission carrier can be fastened to the chassis of a vehicle. Transmission carrier 5 is a hollow body with a central recess 7 which has wall portions on the outside and inside which differ from one another in terms of their diameters.

The transmission further comprises a planetary transmission stage 10 and a second transmission stage 11. Planetary transmission stage 10 and second transmission stage 11 form main transmission 12. This has an input sun shaft 13 on which sun wheel 18 of planetary transmission stage 10 is formed in one piece. In the case of other embodiments, the main transmission can also still have further transmission stages.

Sun wheel 18 meshes with further externally toothed planetary wheels 19 which are mounted at equal distances to one another via cylinder roller bearings rotatably on bearing journals 20 of a planetary web 21. Planetary wheels 19 mesh, apart from with sun wheel 18, also with an internally toothed ring gear 22 which has a fastening flange 23 with which it can be fastened, for example, to a rim of a wheel, to a chain wheel, to a roller drum, to a winch drum or to a mixer drum. Ring gear 22 thus forms the wheel-side output of the transmission. It can be mounted rotatably with the aid of two taper roller bearings 24 installed in an O-arrangement on the outside of transmission carrier 5, which carrier projects from a face side of ring gear 22 into it. Ring gear 22 is closed by a cover on the other face side.

Planetary web 21 is provided with an internal toothing 25 with which it is pushed on a sleeve-shaped second sun wheel 27 provided with an external toothing 26. Sun wheel 27 is arranged coaxially to input sun shaft 13.

Several axially oriented bearing journals 28 are formed on transmission carrier 5 around input sun shaft 13 at equal angular distances to one another, of which bearing journals 28 each mounts an externally toothed spur gear 30 via a two-row anti-friction bearing arrangement 29, which spur gear 30 meshes both with sun wheel 27 and with ring gear 22. Since bearing journals 28 occupy a fixed position in relation to transmission carrier 5, second transmission stage 11 does not have any revolving planetary wheels. Due to the arrangement of the gear wheels between a central wheel and a ring gear which is similar to planetary transmission stage 10, the second transmission stage is, however, also referred to as a planetary transmission stage.

Input sun shaft 13 of main transmission 12, at one end of which sun wheel 18 is formed in one piece, has at its other end an external toothing 31 with which it is pushed into an internal toothing 32 of follower sleeve 33. Follower sleeve 33 and input sun shaft 13 are coupled rotationally conjointly to one another via the toothings. In the region of its inner toothing, follower sleeve 33 is mounted rotatably on transmission carrier 5 via a grooved ball bearing 34. Grooved ball bearing 34 is embodied here as a floating bearing and should primarily improve smooth running. It is, however, also conceivable to mount follower sleeve 33 with a fixed bearing instead of with the aid of a floating bearing. A mounting of the follower sleeve on transmission carrier 5 can also be dispensed with where applicable.

Central recess 7 of transmission carrier 5 has portions with different diameters, wherein grooved ball bearing 34 is located in portion 38 which lies furthest to the inside and has the smallest diameter. Without taking into account a portion which has a diameter which is only slightly larger than portion 38 and is axially relatively short, a portion 39 follows portion 38, which portion 39 has a significantly larger diameter than portion 38 and which ends in wide inner shoulder 40. Over part of the length of portion 39, transmission carrier 5 has a toothing into which every second disk of a disk pack 41 of a parking brake 42 engages. The other half of the disks of disk pack 41 are coupled in a rotationally secured manner with follower sleeve 33.

Disk pack 41 can be pushed via an annular and stepped brake piston 43 which can be actuated hydraulically in one direction by a spring arrangement 44 against inner shoulder 40 of transmission carrier 5, as a result of which the parking brake becomes active. Spring arrangement 44 is supported via a securing ring 45 on transmission carrier 5. A pressure chamber 49 is formed between an outer shoulder 46 of brake piston 43 and an inner shoulder 47, in which portion 39 of central recess 7 of transmission carrier 5 forms a transition into a portion 48 with an even larger diameter, which pressure chamber 49 can be acted upon with pressure and relieved of pressure via a fluid path, not shown in greater detail, in transmission carrier 5 and a hydraulic valve. In the event of pressure chamber 49 being acted upon with pressure, brake piston 43 moves against the springs of spring arrangement 44 so that these no longer act on the disk pack. The parking brake is released. If pressure chamber 49 is relieved of pressure, the spring arrangement pushes disk pack 41 together and onto inner shoulder 40 of the transmission carrier. The brake is actuated.

Figure 2:
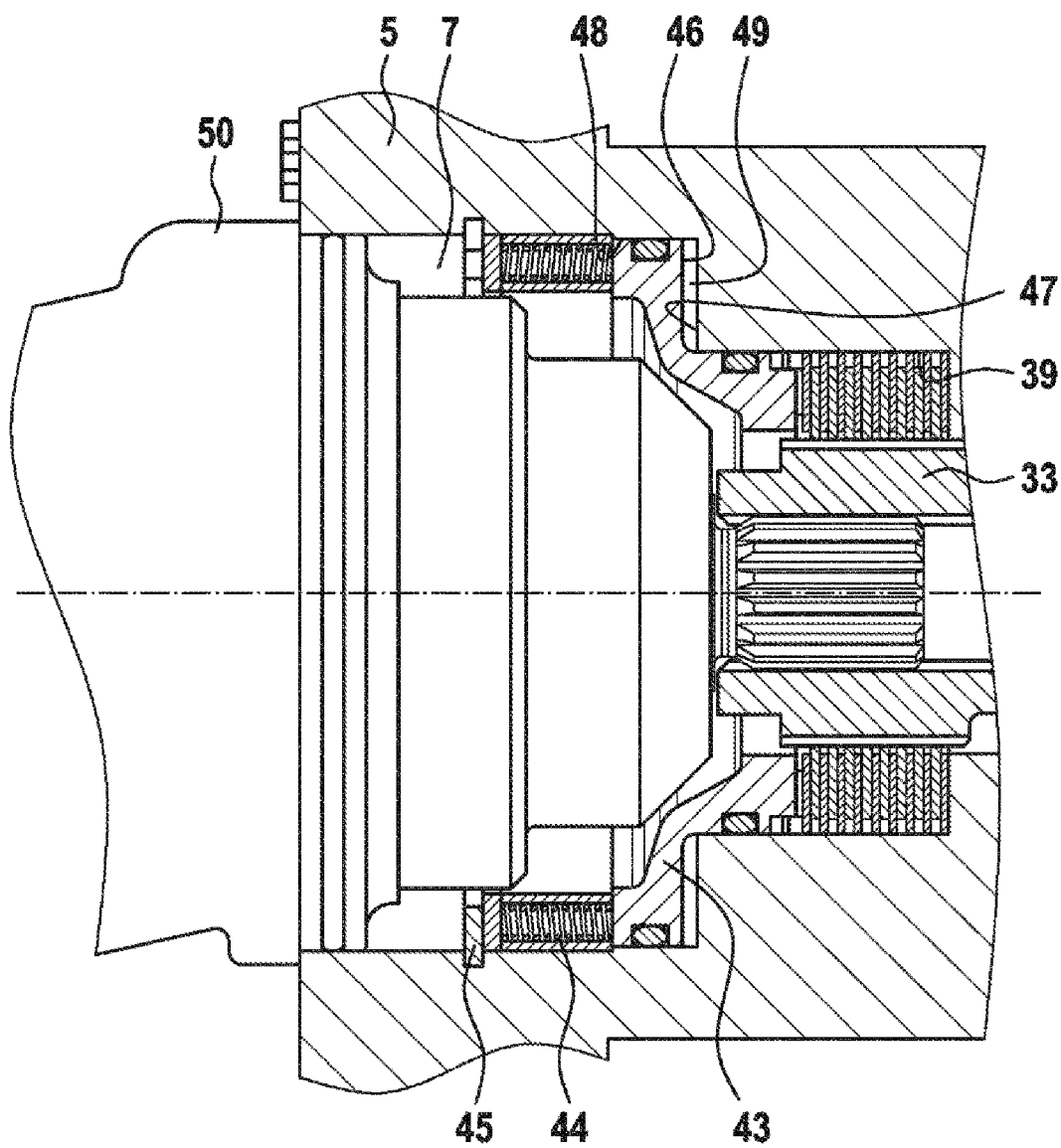
FIG. 2 shows an axial section through a conventional compact transmission with an inserted hydraulic motor.

As is apparent from FIG. 2, the transmission, in so far as it has already been described, is provided to be used with a hydraulic motor 50 pushed in up to an outer shoulder into central recess 7 as a drive motor. Central recess 7, brake piston 43 and spring arrangement 44 including securing ring 45 are configured so that the hydraulic motor can be received in recess 7. In comparison with the transmission according to FIG. 1, only follower sleeve 33 is a different one.

In order to be able to use the transmission in its previously described structure together with an electric motor and achieve a power density which is of a similar magnitude to the use of a hydraulic motor, the transmission according to FIG. 1 additionally has a transmission pre-stage 55 which is accommodated in central recess 7. As a result of such an arrangement, the transmission does not become larger in the axial direction despite the presence of transmission pre-stage 55.

Transmission pre-stage 55 has at a pre-stage input shaft 56 an externally toothed central wheel or sun wheel 57, a pre-stage ring gear 58, which represents the output of transmission pre-stage 55, and several, for example, five pre-stage idler wheels 59, which are arranged between central wheel 57 and pre-stage ring gear 58, have equal angle distances from one another and mesh both with central wheel 57 and with pre-stage internal gear 58. The number of pre-stage intermediate wheels can also be different to five.

Pre-stage intermediate wheels 59 are supported by an additional carrier 60 which is formed to be plate-shaped and is inserted into central recess 7 of transmission carrier 5. For the purpose of fastening to transmission carrier 5, the additional carrier has on the outside a thin circumferential collar 61 which lies in a depression 62 of transmission carrier 5 and is fastened with countersunk screws 63 to transmission carrier 5. Neither additional carrier 60 nor countersunk screws 63 which serve the purpose of its fastening to transmission carrier 5 project over transmission carrier 5. On the contrary, additional carrier 60 and transmission carrier are flush with one another at the face. The transmission of torque between additional carrier 60 and transmission carrier 5 is performed via two dowels which are arranged outside the sectional plane of FIG. 1 and thus cannot be seen in FIG. 1.

Pre-stage intermediate wheels 59 are mounted rotatably via two needle cages 68 on bearing journals formed as hollow pins 69, which bearing journals are centered in depressions 70 of additional carrier 60. There is arranged on the side of pre-stage idler wheels 59 facing away from additional carrier 60 an idler wheel plate 71 which likewise has depressions 70 for immersion of hollow pins 69 and is fastened to additional carrier 60 with the hollow pins as spacers with machine screws 72 which pass through them and the hollow pins and are screwed into additional carrier 60. In each case one thrust washer 73 composed of hardened steel is located between a pre-stage idler wheel 59 and additional carrier 60 as well as between a pre-stage idler wheel 59 and idler wheel plate 71. Idler wheel plate 71 is not a ring, but rather is without a central opening so that pre-stage input shaft 56 can run axially onto the idler wheel plate. Follower sleeve 33 can also run axially onto idler wheel plate 71. In the case of other exemplary embodiments of a compact transmission according to the disclosure, bearing journals 69 can be formed in one piece with additional carrier 60 or in one piece with idler wheel plate 71.

Idler wheel plate 71 can also be embodied as a ring or dispensed with if pre-stage input shaft 56 and follower sleeve 33 are axially mounted or run up axially against one another.

In the case of the compact transmission shown in FIG. 1, needle cages 68 are supplied with lubricating oil in a targeted manner during operation. For this purpose, an annular duct 77 runs around radially between transmission carrier 5 and additional carrier 60, which annular duct 77 is sealed off toward recess 7 by a sealing ring 78 and to the outside by a sealing ring 79. As a result of these sealing rings, the radial gap between transmission carrier 5 and additional carrier 60 is sealed off so that no oil can travel to the outside from the inside of the transmission via this gap. Annular duct 77 is connected via a fluid path, not shown in greater detail, to a lubricating oil port at transmission carrier 5, to which lubricating oil is supplied by an external pump. A space in front of each hollow bolt 69 is fluidically connected to annular duct 77 via in each case one bore 80 in additional carrier 60. The lubricating oil travels from the space via the gap between a machine screw 72 and a hollow pin as well as via a radial bore in the hollow pin to needle cages 68.

A radial shaft seal 81 is arranged between pre-stage input shaft 56 and additional carrier 60 so that recess 7 is also sealed off to the outside here.

Pre-stage ring gear 58 is formed to be bowl-shaped with a base 82 in which a central opening 83 is located. The edge of the central opening is provided with an internal toothing 84 with which pre-stage ring gear 58 is pushed onto externally toothed follower sleeve 33. Pre-stage ring gear 58 is thus coupled via follower sleeve 33 in a rotationally conjoint manner with input sun shaft 13 of the main transmission in such a manner that pre-stage ring gear 58 and input sun shaft 13 have the same rotational speed. The axial position of pre-stage ring gear 58 relative to the follower sleeve is fixed by two securing rings 85 and 86 inserted into follower sleeve 33. It is clearly apparent from FIG. 1 how it is possible, in the case of a short axial installation space as a result of the particular shape of base 82 of pre-stage internal gear 58, which shape is cranked in a longitudinal section, on one hand to couple pre-stage ring gear 58 to follower sleeve 33 and on the other hand to still have available sufficient space for brake piston 43.

An electric actuator can also be provided for the disk brake.

LIST OF REFERENCE NUMBERS

5 Transmission carrier
6 Fastening flange at 5
7 Central recess in 5
10 Planetary transmission stage
11 Further transmission stage
12 Main transmission
13 Input sun shaft
18 Sun wheel
19 Planetary wheels
20 Bearing journal
21 Planetary web
22 Ring gear
23 Fastening flange at 22
24 Taper roller bearing
25 Internal toothing at 21
26 External toothing at 27
27 Second sun wheel
28 Bearing journal at 5
29 Anti-friction bearing arrangement for 30
30 Spur wheels
31 External toothing at 13
32 Internal toothing at 33
33 Follower sleeve
34 Grooved ball bearing
38 Portion of 7
39 Portion of 7
40 Inner shoulder in 7
41 Disk pack
42 Parking brake
43 Brake piston
44 Spring arrangement
45 Securing ring
46 Outer shoulder of 43
47 Inner shoulder in 7
48 Portion of 7
49 Pressure chamber
50 Hydraulic motor
55 Transmission pre-stage
56 Pre-stage input shaft
57 Central wheel
58 Pre-stage ring gear
59 Pre-stage idler wheels
60 Additional carrier
61 Collar at 60
62 Depression at 5
63 Countersunk screws
68 Needle cage
69 Hollow pin
70 Depressions in 60 and 71
71 Idler wheel plate
72 Machine screws
73 Thrust washers
77 Annular duct
78 Sealing ring
79 Sealing ring
80 Bore in 60
81 Radial shaft seal
82 Base of 58
83 Central opening in 82
84 Internal toothing in 83
85 Securing ring
86 Securing ring

The invention claimed is:

1. A compact transmission comprising:
   a transmission carrier configured to be fixed on a frame and which defines a continuous central recess;
   a main transmission comprising:
      an internally toothed ring gear mounted rotatably externally on the transmission carrier;
      an input sun shaft; and
      gear wheels arranged in front of a face side of the transmission carrier, the gear wheels being externally toothed and meshing with the ring gear and the input sun shaft;
   a transmission pre-stage arranged within the central recess of the transmission carrier, the transmission pre-stage comprising:
      a pre-stage input shaft with an externally toothed pre-stage sun wheel;
      a pre-stage ring gear; and
      at least one pre-stage idler wheel which meshes both with the pre-stage sun wheel and the pre-stage ring gear; and
   an additional carrier fastened to the transmission carrier so as to largely cover the central recess, the additional carrier holding the pre-stage idler wheels captively in the central recess of the transmission carrier.

2. The compact transmission as claimed in claim 1, further comprising:
a seal arranged between the additional carrier and the transmission carrier.

3. The compact transmission as claimed in claim 2, wherein the additional carrier is inserted at least partially into the central recess of the transmission carrier and the seal includes a radial seal arranged between the additional carrier and the transmission carrier.

4. The compact transmission as claimed in claim 3, wherein the additional carrier has a circumferential collar with which the additional carrier lies axially on the transmission carrier and with which the additional carrier is fastened to the transmission carrier.

5. The compact transmission as claimed in claim 4, wherein the circumferential collar is received in a depression defined in the transmission carrier, and the additional carrier and the transmission carrier are flush with one another at the face side.

6. The compact transmission as claimed in claim 1, further comprising:
a radial shaft seal arranged between the additional carrier and the pre-stage input shaft.

7. The compact transmission as claimed in claim 1, wherein the pre-stage idler wheels are mounted fixedly on bearing journals located on the additional carrier and wherein the pre-stage ring gear represents an output of the transmission pre-stage.

8. The compact transmission as claimed in claim 7, wherein an idler wheel plate is fastened to the additional carrier with the bearing journals as spacers, the idler wheel plate arranged in front of the face side of the pre-stage idler wheels facing away from the additional carrier.

9. The compact transmission as claimed in claim 8, wherein the bearing journals are formed as hollow pins and the idler wheel plate is fastened to the additional carrier with screws that pass through the bearing journals.

10. The compact transmission as claimed in claim 8, wherein the idler wheel plate extends radially over the pre-stage input shaft and restricts an axial movement of the pre-stage input shaft in one direction.

11. The compact transmission as claimed in claim 7, wherein the bearing journals are centered in depressions defined in the additional carrier and/or the idler wheel plate.

12. The compact transmission as claimed in claim 7, wherein thrust washers are located axially between the pre-stage idler wheels and the additional carrier and/or the idler wheel plate.

13. The compact transmission as claimed in claim 7, wherein:
the pre-stage ring gear is bowl-shaped with a base in which a central opening is located;
an edge of the central opening has an internal toothing; and
the pre-stage ring gear is coupled in a rotationally conjoint manner with the input sun shaft of the main transmission via the internal toothing of the edge of the central opening in such a manner that the pre-stage ring gear and the input sun shaft rotate at the same rotational speed.

14. The compact transmission as claimed in claim 13, wherein the pre-stage ring gear is coupled with the input sun shaft of the main transmission via a follower sleeve which has a first end mounted rotatably on the transmission carrier via a pivot bearing and a second end that is externally toothed and engages into the internal toothing formed at the edge of the central opening of the pre-stage ring gear.

15. The compact transmission as claimed in claim 1, wherein the pre-stage idler wheels include bearings that are supplied with a lubricant via a fluid path which runs at least partially in the additional carrier.

16. The compact transmission as claimed in claim 1, wherein brake disks and an actuating piston of a service brake or a parking brake are arranged in the central recess of the transmission carrier and wherein the transmission pre-stage is located radially within parts of the service brake or the parking brake.

17. The compact transmission as claimed in claim 1, wherein the compact transmission is arranged within a single wheel drive unit.

18. The compact transmission as claimed in claim 1, wherein the at least one pre-stage idler wheel includes a plurality of pre-stage idler wheels.

* * * * *